United States Patent Office 3,697,243
Patented Oct. 10, 1972

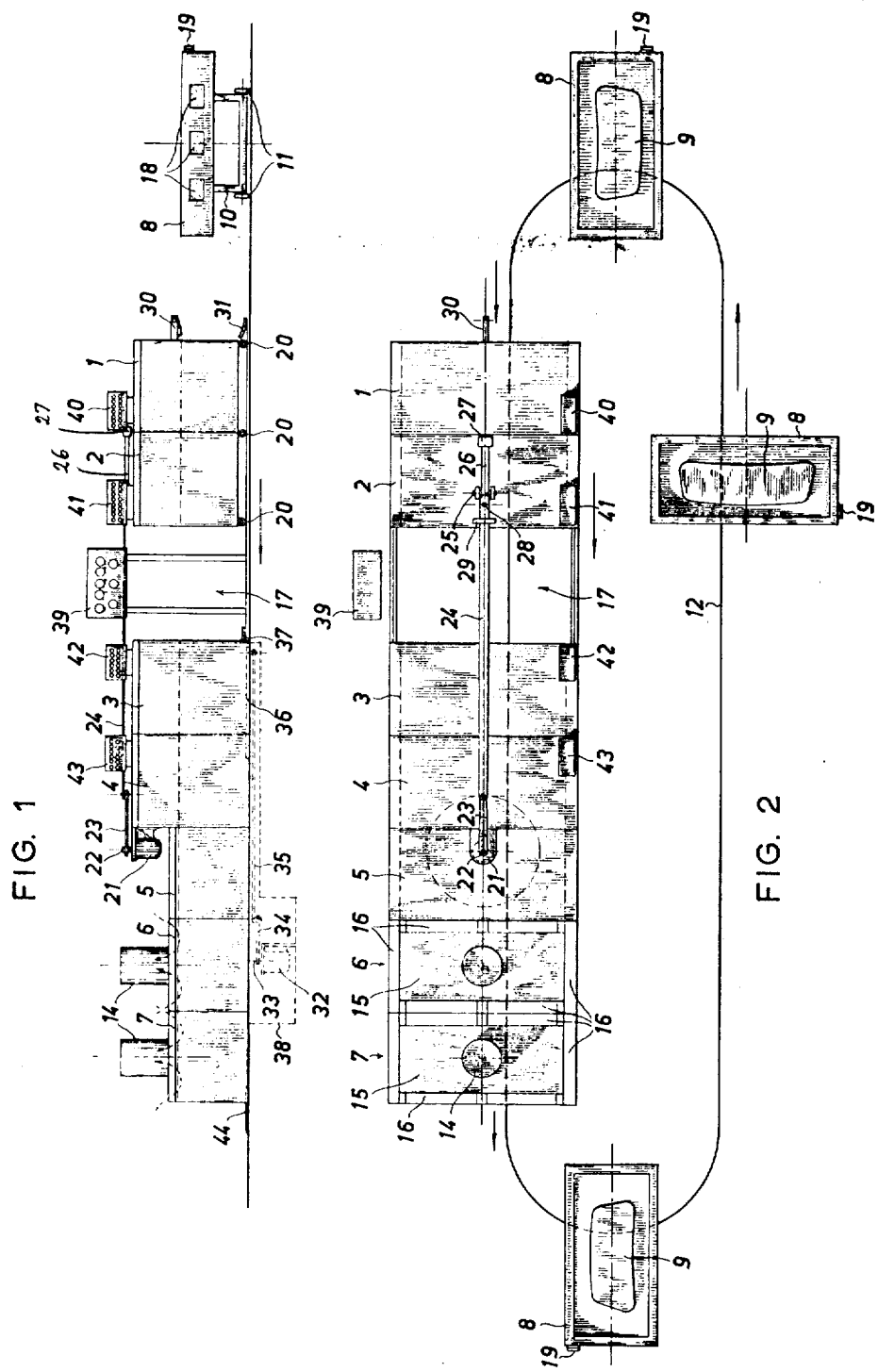

3,697,243
FURNACE FOR HEATING AND BENDING GLASS
PLATES FOR WINDSHIELDS AND THE LIKE
Arvi Artama, Artama Laukontori 4C, Tampere, Finland
Filed Aug. 17, 1970, Ser. No. 64,342
Int. Cl. C03b 23/02
U.S. Cl. 65—273
11 Claims

ABSTRACT OF THE DISCLOSURE

A furnace for heating and bending glass plates, particularly windshields of motor vehicles, wherein the glass plates are loaded on bending forms in form carriers which are moved successively into and out of the furnace, comprising successive heating and cooling chambers, including a movable preheating chamber and a main heating chamber, the two latter being arranged separately from each other, there being formed a space between two successive chambers (preferably the preheating and the main heating chambers) for controlling and adjusting purposes.

---

Figure 3:
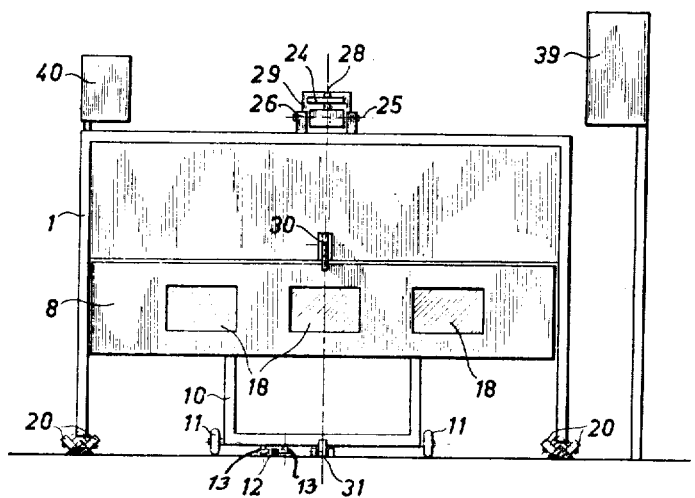

The invention relates to a furnace by means of which glass plates are heated to a bending temperature while they are placed on specially designed forms or carriages where the heated glass plates are bent on account of their own weight in accordance with the shape of the bending forms. The furnace is especially intended to be used for making vehicle windshields and other glass plates having curved surfaces.

Bending furnaces for windshields are already known wherein the glass plates to be bent are placed on forms which are so shaped that their upper surfaces correspond with the desired forms of the bent glass surfaces. In these furnaces the forms loaded with the glass plate are transported on carriers rolling along a suitable track in a heating chamber of a particular type, a tunnel oven or a through-rate type furnace.

In the upper part of the heating chamber there are provided heating units, e.g. for resistance heating, by means of which the glass plates on the forms are heated to a temperature of about 600 to 700° C. so that they soften and bend to the shape of the form located underneath as a result of their own weight.

It is known to provide a furnace of this type with several heating stages such as e.g. first a preheating stage where the form with the glass plate thereon is heated to a suitable preheating temperature, and next an ordinary heating stage for bending, which runs better and faster because of the foregoing preheating.

There are also provided several cooling stages subsequent to the heating stages, combined with the same tunnel oven or furnace. The first cooling stages are usually also provided with heating units in order to make a slow cooling rate possible.

The known constructions of the aforesaid furnaces have some serious defects. Particularly the controlling of the process and the inspection of the bending development are not easy, and these furnaces are not adjustable during the heating process, which may be desirable when various different glass shapes immediately follow one another.

The known furnaces are better suited for successively making identical or similar types of windshields in greater numbers. It is thus not possible to produce at economical prices different types of windshields individually or in small numbers. This is also due to the fact that the known furnaces are of very heavy and massive construction. They accordingly accumulate and store heat in their heavy walls, and so the rapid temperature changes required for various glass types are impossible.

The fact that individual manufacturing of windshields, or in small numbers, is uneconomical is considered to be a serious defect, particularly in the spare-part service for motor vehicles. For example, it may be mentioned that it would be difficult to obtain original windshields for motor cars of older age classes from spare-part dealers or car manufacturers. A windshield manufacturer then needs a particular furnace for economically making windshields in small numbers or individually.

The object of the present invention is to eliminate the drawbacks and defects described above, by means of a new, improved, quick-working, easily controlled and adjustable furnace for the heating and bending of windshield glass plates and the like, particularly in small numbers or individually.

The furnace according to the invention comprises two or more successive heating chambers through which bending forms with glass plates to be bent are transported or pushed, preferably on a suitable carriage. The invention is mainly characterized in that there is provided a space for controlling and adjusting purposes between at least two successive heating chambers, in which space the operator can control and adjust the process in the various chambers.

Further the invention is characterized by the fact that a preheating chamber is movable on runways or the like in the longitudinal direction of the furnace, wherein the bending form with the glass plate, during its movement from the preheating chamber to the main heating chamber, is protected all the time from heat losses in the movable preheating chamber.

Other objects and many of the attendant advantages of the invention will be readily appreciated as the same becomes better understood by reference to the following detailed description, when considered with the accompanying drawing, wherein FIG. 1 presents somewhat schematically a side view of a preferred, exemplary furnace embodiment according to the invention;

FIG. 2 presents a plan view of the furnace shown in FIG. 1; and

FIG. 3 presents a front view of the furnace of FIGS. 1 and 2, to a somewhat larger scale, as seen from the right-hand end of the illustrations.

The furnace according to the invention comprises successively arranged heating chambers 1, 2, 3 and 4, and behind them cooling chambers 5, 6 and 8. These chambers are provided with a conventional framework, preferably of profile steel construction, which is covered as well as lined for good heat insulation and provided with conventional electrical resistance heating elements by means of which heating is performed electrically. The outer surfaces of the chamber are covered with steel sheet or other suitable material.

Successive heating and cooling chambers 1 to 4 and 5 to 7 are made to form a tunnel so that one or more form carriers or carriage 8, for carrying forms loaded with glass plates 9 to be heated and bent, can be pushed successively through the chamber. In the preferred example, more than four carriers are shown, three of them being outside and the others inside the various chambers, as will be explained hereunder in full detail.

Form carriers 8 are like cases having side walls and a bottom but no cover, and their inside walls are lined with a fireproof material. Heating chambers 1 to 4 are also like cases, of similar form, have walls and a cover but no bottom, and are provided with the heating elements for heating to the required temperature the forms with the glass plates on them when the respective form carriers stand within one of the heating chambers.

The upper edges of form carriers 8 and/or the lower edges of heating chambers 1 to 4 can be provided with a heat insulating seal or cover made of, for example, glass-fiber fabric or brush-like glass-fiber bundles extending around the edge surfaces. Because of this insulation heat losses remain small when the form carrier or carriers 8 stand inside the heating chambers.

Form carriers 8 are provided with a support structure 10 as well as with wheels 11 upon which they run on the floor surface, or on tracks or runways, and can be transported or pushed into and out of the furnace as well as though the same, from one stage to the other.

In the illustrated examplary embodiment carriers 8 are guided in their movement along an endless, e.g. oval rail 12 and by laterally engaging rolls 13. The carriers can also be guided so that the rail is made with a grooved profile and the carrier wheels would run in the groove (not shown).

Chambers 1 and 2 are preheating chambers for the purpose of increasing the speed of heating for the actual bending. Also strain on the glass plates as well as possible breaking can be avoided through heating in several stages. The actual bending heating is performed in chamber 3 at which time the glass plate bends, in a known manner, through its own weight to the shape of the form.

From chamber 3 carriage 8 with the form is pushed into the following chamber 4 in which cooling already begins. The cooling should however be slow enough to avoid strains and cracking, for which reason chamber 4 is also provided with conventional heating units which are capable of maintaining the desired temperature in that chamber.

Carriage or carriers 8 are necessively transported into the following chambers 5, 6 and 7 in which cooling is continued.

Chambers 6 and 7 are provided with air pipes 14 causing an air stream or draft, the air streaming into the chambers through side openings 16 by the edges of covers 15 and out again through pipes 14.

According to one of the important features of the invention, novelty lies mainly in the fact that preheating chamber 2 and main heating chamber 3 are separate from each other, leaving a free space 17 between them, in which space the operator can watch the glass plates being heated and bent in chambers 2 and 3, on form carriers 8, and can adjust the temperature if needed. The glass plates are visible through a preferably quartz-glass window 18 or more windows disposed on at least one side wall of the form carriages, as shown in FIGS. 1 and 3.

For more complicated cases carriages 8 are also provided with heating units, and electric current is conducted through a contract 19 situated for example on one end wall of the carriage, which is made to touch a corresponding contact (not shown) on the inner side wall of chamber 3.

According to a further important feature of the invention preheating section 1, 2 is made movable in the longitudinal direction so that it can be pushed quite close to main heating chamber 3 when form carrier 8 moves from the preheating to the main heating section. Thus form carrier 8 is then protected from heat losses but control space 17 is nevertheless available when needed. Preheating section 1, 2 is provided with supporting wheels 20 by means of which the chambers can move on longitudinal runways on the floor.

The furnace according to the invention is provided with a particular mechanism for the moving of form carriers 8 from one stage to the other. This mechanism operates in the preferred embodiment according to the principle of crank movement. The mechanism includes two crank-drive mechanisms, one for moving preheating section 1, 2 as well as a form carrier 8 inside it, while the other moves a respective form carrier in main heating chamber 3 and other in the successive chambers 4, 5, 6 and 7.

The above-mentioned mechanism includes a slowly running gear-head motor 21 mounted on the upper part of stationary chamber 4. Motor 21 is mounted vertically and provided with conventional limit switches (not shown) such that its shaft 22 rotates only a half turn at a time. At the end of shaft 22 is mounted a crank 23 whose length is half the width of any furnace chamber 1 to 7 as seen in the longitudinal direction of the furnace. The width of form carriers 8 is naturally the same or slightly smaller.

To crank 23 is connected a drawbar 24 which at its other end is connected to the upper part of preheating section 1, 2. The connection is such that it is released by the action of a predetermined force. This arrangement is made as safety contrivance should the operator by mistake remain standing in control space 17 while preheating section 1, 2 moves close to main heating chamber 3. The prevents the risks of accidents.

A connecting device according to the invention includes a releasing lever 26 with a horizontal shaft 25, and at the other end of lever 26 is mounted a weight 27. At the shorter end is fastened an upright connecting shaft 28 with a spherical upper end, to be connected with a hole at the end of drawbar 24.

The latter is also guided by a part 29 having a horizontal oblong opening through which drawbar 24 passes. Now when some obstruction (for example the operator in control space 17) limits the movement of preheating section 1, 2, the connection releases when the force becomes so great that lever 26 swings up far enough to release shaft 28 from the end of drawbar 24 (see FIG. 3 and also FIG. 2).

When a carrier 8 is transported in front of preheating section 1, 2 a pawl 30 mounted on the wall of these chambers engages the edge of carrier 8, and when now preheating section 1, 2 moves close to main heating chamber 3, pawl 30 draws carrier 8 along with it.

When the preheating section moves in the opposite direction, the carrier which was in chamber 2 is moved under chamber 3, drawn by the lower crank-drive mechanism to be described in detail somewhat later. During the backward motion of preheating section 1, 2 a pawl 31 keeps the two remaining carriers 8 standing on the floor, whereupon the preheating section moves over them, and at the same time pawl 30 catches the edge of the following carrier 8, after which the procedure is repeated when the carriers have been within preheating section 1, 2 a sufficient time.

The crank-drive mechanism which moves the carriers 8 under main heating chamber 3 and cooling chambers 5 to 7 includes a gear-head motor 32 whose number of revolutions on its output shaft 33 is small, a crank 34 being fastened to shaft 33 and a drawbar 35 articulated to crank 34. The movement of the latter is limited by appropriate limit switches (not shown) so that shaft 33 rotates only a half turn at a time. Furthermore under chamber 3 is mounted on the floor a longitudinal runway 36 and a slide provided with a pawl 37, attached on runway 36. The before-mentioned mechanism 32 to 36 is mounted in a space 38 somewhat beneath the floor. When preheating section 1, 2, at the end of its movement, comes close to main heating chamber 3, pawl 37 of the drawing attachment catches on the form carrier 8 which is in chamber 2, and now the lower crank mechanism 32 to 37 begins to draw this carrier into chamber 3. At the same time the carrier which was there previously is pushed ahead into chamber 4, and so on for the whole row of chambers, after which the first carrier comes out from under cooling chamber 7, in a sufficiently cooled condition, in order to make possible further handling of the glass plate and removing it from the form, as well as preparing it for the following operational stages.

The form carriers are then loaded with new glass plates, and they will again make a round through the inventive furnace while the process is continued. For the braking of the movement of form carriers 8 there is provided a self-acting brake lever 44 mounted on the floor under the outer edge of last chamber 7.

As the furnace according to the present invention is easily adjustable and its functions are easily controllable, the successively moving form carriers are capable of being loaded with forms of various shapes, for various kinds of glass windshields.

The functions of the furnace are preferably adjusted by means of a control panel 39 situated on the side of the set-up close to space 17. For adjusting the temperatures of the various chambers there are provided, for each chamber, switch boxes 40, 41, 42 and 43 which also include safety fuses and the like known elements for the electrical heating units.

By means of a push-button switch, e.g. on panel 39, the operator starts the functions of the crank mechanism for moving form carriers 8 as well as preheating section 1, 2 as soon as the glass plates on the form carriers within heating chambers 3, 4 are sufficiently heated. It is to be noted that at the start the moving mechanism for the preheating section starts first and only when the latter is moved close to main heating chamber 3 does the lower drive mechanism start.

It is also possible to use a known program control for the functions of the furnace, which determines the heating time according to a given program, so far as this is always true for particular glass shapes. The operator in control space 17 can always control and adjust the differences and errors in the critical parameters.

Instead of the described crank mechanisms it is possible to use other mechanisms or hydraulic means having the same effects.

Instead of the form carriers being transported in an endless path on the floor surface it is also possible to use a structure in which the reverse motion of the form carriers from the end of the furnace back to the preheating section at the beginning is performed above the furnace chambers, e.g. on an elevated track of known construction. By such means it may be possible to save valuable floor space.

It should be understood, of course, that the foregoing disclosure relates only to a preferred, exemplary embodiment of the inventive furnace, and that it is intended to cover all changes and modifications of the example described which do not constitute departures from the spirit and scope of the invention.

What is claimed is:

1. A furnace for heating and bending glass plates, particularly windshields of motor vehicles, wherein the glass plates are loaded on bending forms in form carriers which are moved successively into and out of the furnace, comprising, in combination, successive heating and cooling chambers, including a movable preheating chamber and a main heating chamber, the two latter being arranged separately from each other, said chambers having openings constituting a tunnel when longitudinally aligned, for passage of said carriers therethrough, there being formed a space between at least two successive ones of said chambers for controlling and adjusting purposes, for heating the glass plates loaded on said forms in said carriers as they are successively moved through said chambers, further comprising a runway along said chambers, allowing said carriers and said preheating chamber to be moved therealong, and crank-drive means including mechanisms for effecting independently movements of said preheating chamber and of said carriers.

2. The furnace as defined in claim 1, further comprising individually adjustable heating means in at least the first one of said chambers, as viewed in the direction of movement of said carriers.

3. The furnace as defined in claim 1, wherein at least one of said chambers is provided with a cover and an air pipe open to the atmosphere, at least one edge of said cover being provided with an opening, for cooling said at least one chamber by means of an air draft allowed to pass through said air pipe and said opening.

4. The furnace as defined in claim 1, further comprising brake means adjacent the outer edge of the last one of said chambers, as viewed in the direction of movement of said carriers, for braking said movement.

5. The furnace as defined in claim 1, further comprising individually adjustable heating means in at least one of said carriers, first contact means on the end wall of said at least one carrier and second contact means on an inner side wall of at least one of said chambers, for touching said first contact means and providing electrical connection for said heating means.

6. The furnace as defined in claim 1, further comprising a pawl provided on the outer edge of said preheating chamber for catching an edge of said carriers for simultaneous movement therewith.

7. The furnace as defined in claim 1, further comprising a pawl on the floor under the outer edge of said preheating chamber, for immobilizing said carriers while said preheating chamber is moved backwards, away from said main heating chamber.

8. The furnace as defined in claim 1, wherein said crank-drive means includes a first mechanism for moving at least said preheating chamber alternatively toward and away from said main heating chamber into close alignment therewith, including a gear-head motor having an output shaft with a low number of revolutions, a crank fastened to said shaft and a drawbar articulated to said crank, said drawbar being connected to said preheating chamber.

9. The furnace as defined in claim 8, further comprising means for releasing the connection between said drawbar and said preheating chamber by the action of a predetermined force.

10. The furnace as defined in claim 1, wherein said crank-drive means includes a second mechanism for successively moving said carriers within and along the tunnel formed in said chambers, including a gear-head motor having an output shaft with a low number of revolutions, a crank fastened to said shaft and a drawbar articulated to said crank, said drawbar being adapted to catch a portion of one of said carriers.

11. The furnace as defined in claim 10, wherein said second mechanism is lodged in a floor space beneath and along some of said chambers.

References Cited

UNITED STATES PATENTS

| | | | |
|---|---|---|---|
| 3,166,397 | 1/1965 | Hohmann et al. | 65—289 X |
| 3,476,543 | 11/1969 | Dorsey | 65—356 X |
| 3,278,288 | 10/1966 | Leflet, Jr. | 65—104 |

ARTHUR D. KELLOGG, Primary Examiner

U.S. Cl. X.R.

65—275, 289, 356, 350